United States Patent
England et al.

[15] 3,694,460
[45] Sept. 26, 1972

[54] PREPARATION OF 2,4-BIS(HEXAFLUOROISOPROPYLIDENE) 1,3-DITHIETANE BY REACTION OF PERFLUOROISOBUTENE WITH SELECTED ALKALI METAL SALTS

[72] Inventors: David C. England; Maynard S. Raasch; William Arthur Sheppard, all of Wilmington, Del.

[73] Assignee: E. I. du Pont de Nemours and Company, Wilmington, Del.

[22] Filed: Feb. 16, 1971

[21] Appl. No.: 115,745

[52] U.S. Cl. ................................260/327 M
[51] Int. Cl. ..................................C07d 69/00
[58] Field of Search .......................260/327 M

[56] References Cited

UNITED STATES PATENTS 3,275,609   9/1966   Raasch ...................260/79.7
3,544,591   12/1970  England....................260/327

FOREIGN PATENTS OR APPLICATIONS 246,508   11/1969   U.S.S.R. ....................260/327

Primary Examiner—Henry R. Jiles
Assistant Examiner—Cecilia M. Shurko
Attorney—James A. Costello

[57] ABSTRACT

Disclosed herein is a process for preparing 2,4-bis(hexafluoroisopropylidene)-1,3-dithietane by reacting perfluoroisobutene with alkali metal salts of selected organic sulfur-containing acids at temperatures of about −80° to 150° C.

7 Claims, No Drawings

PREPARATION OF 2,4-BIS(HEXAFLUOROISOPROPYLIDENE)A(C DITHIETANE BY REACTION OF PERFLUOROISOBUTENE WITH SELECTED ALKALI METAL SALTS

BACKGROUND OF THE INVENTION

1. Field of the Invention

This invention concerns a new process for preparing 2,4-bis(hexafluoroisopropylidene)-1,3-diethietane which is the dimer of bis(trifluoromethyl)thioketene.

2. Description of the Prior Art

The compound 2,4-bis(hexafluoroisopropylidene)-1,3-diethietane is disclosed in M. S. Raasch, U. S. Pat. No. 3,275,609, along with a process for its preparation according to the equation

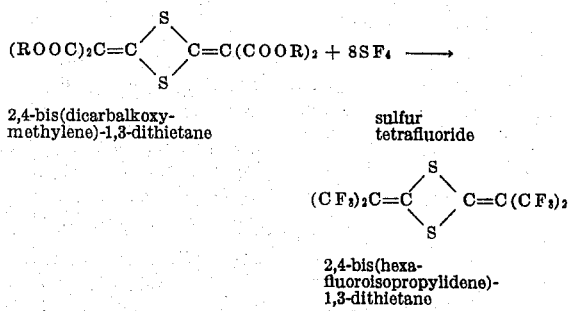

wherein R is a lower alkyl group.

D.C. England, U. S. Pat. No. 3,544,591, discloses in the most pertinent aspect, making 2,4-bis(hexafluoroisopropylidene)-1,3-dithietane by the following process $$2(CF_3)_2C=CX_2 + 2M_2S \longrightarrow$$

perfluoriso-    alkali
butene         metal
(when X=F)   sulfide

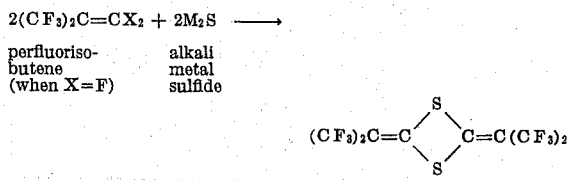

Unlike the reaction mechanisms of the England patent, the novel process taught herein does not rely on the formation of sulfide ion from the sulfur-containing starting material. No sulfide ion is formed in the novel process and the reaction proceeds by a different route.

In Knunyants, et al., Russian Pat. No. 246,508, the dithietane is prepared by reacting perfluoroisobutene with thioacid salts such as potassium diethylthiophosphate,

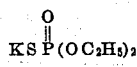

potassium thiocyanate, KSCN, and sodium thiosulfate, $Na_2S_2O_3$. The potassium diethylthiophosphate has its sulfur covalently bonded to phosphorus and the other two are inorganic salts.

SUMMARY OF THE INVENTION

A process has now been discovered for the preparation of 2,4-bis(hexafluoroisopropylidene)-1,3-dithietane by the reaction of perfluoroisobutene with an alkali metal salt of an organic sulfur-containing acid in which the metal is ionically bonded to sulfur that is in turn covalently bonded to carbon.

The contemplated alkali metal salts of organic sulfur-containing acids are characterized by their capacity to ionize at the metal-sulfur bond to yield an alkali metal cation and a monovalent organic anion with its charge associated with sulfur.

The salts have the formula

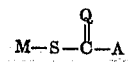

wherein:
M = lithium, sodium, potassium, rubidium or cesium,
Q = S, O, or N—$C_6H_5$,
A = $NR^1R^2$, $OR^3$, SM, or $R^1$,
$R^1$ = alkyl of up to eight carbon atoms or phenyl,
$R^2$ = $R^1$ or H, and
$R^3$ = alkyl of up to eight carbon atoms.

When:
Q = S
and
A = $NR^1R^2$, the salt is a dithiocarbamate,
A = $OR_3$, the salt is a xanthate,
A = SM, the salt is a trithiocarbonate,
A = $R^1$, the salt is of a dithioacid.

When:
Q = O
and A = $NR^1R^2$, the salt is a monothiocarbamate,
A = SM, the salt is a dithiocarbonate,
A = $R^1$, the salt is of a monothioacid.

When:
Q = $NC_6H_5$
and
A = $NR^1R^2$, the salt is of a trisubstituted thiourea,
Q = $NC_6H_5$
and
A = $R^1$, the salt is of a thioamide.

It is noted that the alkyl groups of up to eight carbon atoms in $R^1$ and $R^3$ can be straight, cyclic or branched chain structures.

The preferred salts are the alkali metal dithiocarbamates (in which Q = S and A = $NR^1R^2$). With their use the best yields of 2,4-bis(hexafluoroisopropylidene)-1,3-dithietane are obtained. See, for instance, Example 2 where a 68 percent yield is obtained.

The process of the invention may be carried out at temperatures in the range from −80° to 150° C. Preferred temperatures are in the range from −25° to +° C., especially that portion of the range between −25° to 5° C., which latter temperature is the boiling point of perfluoroisobutene.

DETAILS OF THE INVENTION

The process of the invention may be carried out neat by contacting the selected alkali metal salt with perfluoroisobutene, the latter preferably in liquid state. However, the reaction is exothermic and it is preferred practice to carry it out in the presence of a reaction medium which is inert to the reactants and products. The reaction medium assists in dissipating the heat of reaction and provides good contact between the reactants.

The preferred media are aprotic liquids in which perfluoroisobutene and the selected salt are at least somewhat soluble. Thus, there may be employed water, ethers such as diethyl ether, ethylene glycol dimethyl ether (glyme), diethylene glycol dimethyl ether (diglyme) and tetrahydrofuran; nitrohydrocarbons such as nitromethane, nitroethane and nitrobutane; N,N-disubstituted amides such as dimethylformamide and diethylacetamide; organic nitriles such as acetonitrile and benzonitrile and mixtures of these.

Time and pressure are not critical reaction variables. When a liquid reaction medium is used, the reaction is essentially complete by the time the reactants have all been brought in contact. Small increases in yield of product may be obtained by allowing the reaction mixture to stand for periods of from one-half hour to one hour before recovery of the product. Pressures both above and below atmospheric pressure may be employed. Preferred pressures are atmospheric and slightly elevated pressures, i.e., up to 10 atmospheres such as might be obtained from autogenous pressure of perfluoroisobutene when the reaction is carried out in a closed reactor.

The proportions of the reactants which may be brought together to effect the process of this invention may be varied widely. For example, molar ratios of perfluoroisobutene: alkali metal salt from 1:20 to 20:1 may be employed. However, it is preferred not to use perfluoroisobutene in excess amounts because perfluoroisobutene is toxic and may have to be eliminated from the final product. Equimolar proportions of the reactants are preferred. The reaction is suitable for carrying out on either a batch or continuous basis.

2,4-Bis(hexafluoroisopropylidene)-1,3-dithietane is a crystalline solid which melts at about 85° C. and boils at 170° C. at atmospheric pressure. It may be recovered from the reaction mixture of the present invention by known means such as by distillation, sublimation, crystallization and the like. It may be purified by sublimation or by recrystallization from a suitable solvent such as petroleum ether, carbon tetrachloride or hexane.

The 2,4-bis(hexafluoroisopropylidene)-1,3-dithietane has high thermal stability (up to about 400° C.) and is useful, inter alia, as a heat transfer medium. It is also useful in the synthesis of bis(trifluoromethyl)thioketene monomer.

SPECIFIC EMBODIMENTS

In the Examples which follow, parts are by weight unless otherwise indicated. These Examples are meant to illustrate but not to limit the invention.

EXAMPLE 1

A mixture of 3.3 g of N,N-diethyldithiocarbamic acid sodium salt, 3 ml of diethylene glycol dimethyl ether and 9 g of perfluoroisobutylene was sealed in a Carius tube at liquid nitrogen temperature. On melting and mixing at room temperature an exothermic reaction occurred. After standing 0.5 hour the tube was cooled, opened and the contents poured into water. The heavy oil which separated was distilled under reduced pressure to give 2.2 g of $(C_2H_5)_2NCSF$, bp 70° C./2 mm. Crystals of 2,4-bis(hexafluoroisopropylidene)-1,3-diethietane collected in the −78° C. trap attached to the still.

EXAMPLE 2

A mixture of 113 g (0.5 mol) of N,N-diethyldithiocarbamic acid sodium salt trihydrate and 300 ml of ethylene glycol dimethyl ether (glyme) was stirred in a three-neck flask fitted with a dry ice-cooled condenser and thermometer while adding as gas 98 g (0.49 mol) of perfluoroisobutylene, keeping the temperature at −° C. to 0° C. by cooling. When addition was complete, the mixture was allowed to come to room temperature with stirring and then poured into cold dilute sulfuric acid. The heavy oil was diluted with methylene chloride, washed three times with water, dried over magnesium sulfate, filtered and methylene chloride removed by distillation. The resulting oil was cooled in ice and crystals which separated were filtered to give 42 g of 2,4-bis(hexafluoroisopropylidene)-1,3-dithietane, mp 83°–85° C. A mixed melting point with material made from perfluoroisobutylene and potassium sulfide showed no lowering. Distillation of the filtrate caused an additional 23 g of the dithietane to sublime (mp 78°–83.5° C.) making the total yield 65 g (68 percent). The distillation also gave 44 g (66 percent) of $(C_2H_5)_2NCSF$, bp 45° C./0.9 mm. It was characterized by nmr and analyses.

Anal. Calcd. for $C_5H_{10}NSF$:
C, 44.48; H, 7.47; N, 10.38; S, 23.75; F, 14.07
Found: C, 44.33; H, 7.39; N, 10.31; S, 23.82; F, 15.26.

EXAMPLE 3

The procedure of Example 2 was repeated except that one-half the amount of perfluoroisobutylene was used (45 g). The yield of dithietane was 22 g (46 percent) obtained by filtration.

EXAMPLE 4

Example 2 was repeated using 56 g (0.25 mol) of the dithiocarbamate salt, 150 ml of glyme and 73 g of a gas mixture which was approximately 68 percent perfluoroisobutylene (50 g, 0.25 mol), 14.8 percent perfluoropropene, 11.8 percent perfluorobutenes and perfluorocyclobutane and 5.4 percent low-boiling material. The yield of dithietane was 28 g (58 percent) obtained by filtration.

EXAMPLE 5

A mixture of 16 g (0.1 mol) of potassium ethyl xanthate and 150 ml of glyme was stirred in a three-neck flask fitted with a dry ice-cooled condenser and thermometer while adding as gas 22.5 g (0.11 mol) of perfluoroisobutylene. Reaction was exothermic and the mixture was kept at about 0° C. with cooling. Stirring was continued after addition of gas was complete until the temperature of the mixture reached 20° C. It was then poured into cold, dilute sulfuric acid and filtered. Recrystallization from petroleum ether gave in successive crops 1.7 g, mp 80-84°C; 4.9 g, mp 79°–82° C.; 7.1 g, mp 52°–55° C. and 0.8 g, mp 51°–54° C. The first two crops (6.2 g, 34 percent) were characterized by mixed melting point and infrared as 2,4-bis(hexafluoroisopropylidene)-1,3-dithietane and the last two as largely $C_2H_5OC(S)SC(S)OC_2H_5$.

EXAMPLE 6

A dark red aqueous solution of potassium trithiocarbonate, $(KS)_2CS$, was prepared as described in Organic Syntheses, Collective Vol. IV, p. 967. A mixture of 40 g (ca, 0.1 mol) of this solution and 150 ml of glyme in a three-neck flask fitted with a thermometer and dry ice-cooled condenser was stirred while adding 22.5 g (0.11 mol) of perfluoroisobutylene at about 0° C. When addition was complete the mixture was allowed to come to room temperature and poured into dilute acid. The heavy oil which separated was cooled in an ice bath. Crystals which separated were recrystallized from petroleum ether to give 3.2 g (16 percent) of 2,4-bis(hexafluoroisopropylidene)-1,3-dithietane.

When sodium dithiocarbonate, $(NaS)_2CO$, is substituted for potassium trithiocarbonate in the procedure of Example 6, a similar yield of 2,4-bis(hexafluoroisopropylidene)-1,3-dithietane is obtained.

EXAMPLE 7

A mixture of 45 g (0.25 mol) of N,N-dimethyldithiocarbamic acid sodium salt dihydrate in 150 ml of glyme was reacted with 51 g (0.25 mol) of perfluoroisobutylene as described for Example 2. The yield of 2,4-bis(hexafluoroispropylidene)-1,3-dithietane was 28 g (56 percent).

EXAMPLE 8

When the procedure of Example 7 was repeated using the impure perfluoroisobutylene (81 g of 68 percent purity) described in Example 4, the yield of 2,4-bis(hexafluoroisopropylidene)-1,3-dithietane was 26 g (52 percent).

EXAMPLE 9

A mixture of 18.8 g (0.1 mol) of potassium tertbutylxanthate in 150 ml of glyme was stirred in a three-neck flask fitted with a dry ice-cooled condenser and thermometer. Perfluoroisobutylene (20 g, 0.1 mol) was added as gas, keeping the temperature at −10° to +5° C. When addition was complete, the mixture was heated to reflux, cooled and poured into dilute sulfuric acid. The heavy red oil which separated was cooled, filtered and the solid recrystallized from petroleum ether to give 2 g (10 percent) of 2,4-bis-(hexafluoroisopropylidene)-1,3-dithietane, mp 81°–84° C.

EXAMPLE 10

A mixture of 18 g (0.1 mol) of N-ethyldithiocarbamic acid sodium salt dihydrate in 150 ml of glyme was reacted with 20 g (0.1 mol) of perfluoroisobutylene and worked up as described in Example 2. On addition of the reaction mixture to dilute sulfuric acid a solid separated. It was filtered and air-dried (6.4 g). Recrystallization from carbon tetrachloride gave a mixture of crystals, mp 81°–110° C. Presence of 2,4-bis(hexafluoroisopropylidene)-1,3-dithietane was indicated by the characteristic crystal plates and confirmed by infrared absorption analysis.

EXAMPLE 11

Perfluoroisobutylene (20 g, 0.1 mol) was reacted with N,N-dimethyldithiocarbamic acid sodium salt dihydrate (18 g, 0.1 mol) and worked up as described for Example 2. In three separate experiments there was used as solvent, respectively, (1) a mixture of 25 ml of water with 25 ml of glyme, (2) 50 ml of tetrahydrofuran, and (3) 50 ml of glyme. The 2,4-bis(hexafluoroisopropylidene)-1,3-dithietane product was filtered from the dilute sulfuric acid and air-dried to give respective yields of 4.4 g (23 percent), 4.1 g (22 percent) and 7.7 g (40.5 percent).

EXAMPLE 12

A mixture of 20 g (0.1 mol) of N,N-diisopropyldithiocarbamic acid sodium salt in 50 ml of glyme was stirred in a 3-neck flask fitted with a thermometer and dry ice-cooled condenser. Perfluoroisobutylene (20 g, 0.1 mol) was added as gas at −10° to +13° C. When the addition was complete the mixture was stirred at 0° C. for 0.5 hour. It was then poured into a cold solution of 50 ml of concentrated sulfuric acid in 200 ml of water. Solids were collected by filtration and air-dried to yield 12 g of mixed crystals, mp 77°–96° C. They were recrystallized from hexane to give 5.2 g, mp 83°–94° C., and from the oily filtrate there was recovered by recrystallization 1.8 g of crystalline plates of 2,4-bis(hexafluoroisopropylidene)-1,3-dithietane, mp 83°–84 C.

EXAMPLE 13

Perfluoroisobutylene (20 g, 0.1 mol) was reacted with a mixture of 23 g (0.1 mol) of N,N-dibutyldithiocarbamate sodium salt in 50 ml of glyme according to the procedure described for the diisopropylcarbamate in Example 12. The yield of 2,4-bis(hexafluoroisopropylidene)-1,3-dithietane, mp 80°–82° C., was 6.2 g (31 percent).

EXAMPLE 14

A mixture of 9 g (0.05 mol) of $C_6H_5COSK$ (potassium salt of thiobenzoic acid) and 25 ml of glyme was kept at 0° to −10° C. and stirred in a three-neck flask fitted with a thermometer and dry ice-cooled condenser while adding as gas 11 g (0.055 mol) of perfluoroisobutylene. When addition was complete, stirring was continued for 0.5 hour at 0° C., and the mixture was then poured into a solution of 54 ml of concentrated sulfuric acid in 200 ml of water. The heavy layer which separated was diluted with methylene chloride, washed with water, dried over magnesium sulfate, filtered and methylene chloride removed by distillation. The mixture was then cooled and 1.2 g of white crystals filtered off. Distillation of the filtrate caused additional crystals to sublime in the still. All crystalline material was combined and recrystallized from petroleum ether to give 1.1 g (11 percent) of 2,4-bis(hexafluoroisopropylidene)-1,3-dithietane, mp 81°–84 C. It was characterized by infrared absorption analysis and by mixed melting point with an authentic sample.

When the sodium salt of dithiobenzoic acid $(C_6H_5CSSNa)$ is substituted for potassium thiobenzoate in the procedure of Example 14, a similar yield of 2,4-bis-(hexafluoroisopropylidene)-1,3-dithietane is obtained.

EXAMPLE 15

Perfluoroisobutylene (11 g, 0.055 mol) was reacted with 6 g (0.05 mol) of CH₃COSK (potassium salt of thioacetic acid) in 25 ml of glyme using the same conditions as described in Example 14. From the product mixture there was recovered 0.1 g of crystalline 2,4-bis(hexafluoroisopropylidene)-1,3-dithietane, mp 81°–83 C. (from petroleum ether). It was characterized by mixed melting point and infrared absorption analysis.

When the sodium salt of dithiobutyric acid (C₃H₇CSSNa) is substituted for potassium thioacetate in the procedure of Example 15, a similar yield of 2,4-bis(hexafluoroisopropylidene)-1,3-dithietane is obtained.

EXAMPLE 16

Perfluoroisobutylene (11 g, 0.055 mol) was reacted with 8 g (0.059 mol) of (CH₃)₂NCOSK (potassium salt of N,N'-dimethylmonothiocarbamic acid) in 25 ml of glyme using the same conditions as described in Example 14. The oily product was distilled. Material which distilled around 130° C. (5.9 g) solidified and was recrystallized from petroleum ether to give 3.3 g (34 percent) of pure 2,4-bis(hexafluoroisopropylidene)-1,3-dithietane, mp 83°–85° C. It was characterized by mixed melting point and infrared absorption analysis.

EXAMPLE 17

Perfluoroisobutylene (11 g, 0.055 mol) was reacted with 9 g (0.052 mol) of C₆H₅N=C(CH₃)SNa (sodium salt of thioacetanilide) using the same conditions as described in Example 14. Crystalline material which was filtered from the crude product was combined with material which sublimed on distillation and the mixture recrystallized from petroleum ether to give 1.2 g (12 percent) of pure 2,4-bis(hexafluoroisopropylidene)-1,3-dithietane, mp 83°–85° C. It was characterized by mixed melting point and by infrared absorption analysis.

EXAMPLE 18

A mixture of 11.5 g (0.05 mol) of C₆H₅NHCSNHC₆H₅ (thiocarbanilide) in 50 ml of glyme was stirred and cooled at 0°–10° C. while adding slowly 2.5 g (0.05 mol) of sodium hydride as a 50 percent suspension in mineral oil. When reaction was complete (hydrogen evolution and disappearance of gray color with the formation of the sodium salt of thiocarbanilide) stirring and cooling were continued while adding 11 g (0.050 mol) of perfluoroisobutylene as gas. When addition was complete stirring was continued for 1 hour at 0° C. The mixture was then poured into dilute sulfuric acid causing a gummy solid to separate. This solid was extracted with warm petroleum ether and the ether removed by distillation. The mixture was cooled in ice, filtered and recrystallized to give 2 g (20 percent) of pure 2,4-bis(hexafluoroisopropylidene)-1,3-dithietane, mp 83°–85° C. It was characterized by mixed melting point and infrared absorption analysis.

The embodiments of the invention in which an exclusive property or privilege is claimed are defined as follows:

1. A process for preparing 2,4-bis(hexafluoroisopropylidene)-1,3-dithietane comprising reacting, at a temperature of −80° to 150° C., perfluoroisobutene with an alkali metal salt of the formula

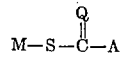

wherein:
M = lithium, sodium, potassium, rubidium or cesium,
Q = S, O or NC₆H₅,
A = NR¹R², OR³, SM or R¹,
R¹ = alkyl of up to eight carbon atoms or phenyl,
R² = R¹ or H, and
R³ = alkyl of up to eight carbon atoms.

2. A process according to claim 1, carried out in the presence of an aprotic liquid medium.

3. A process according to claim 1, employing equal molar proportions of perfluoroisobutene and alkali metal salt.

4. A process according to claim 1, employing equal molar proportions of perfluoroisobutene and alkali metal salt at a temperature in the range of −25° to +5° C., in the presence of an aprotic liquid medium.

5. A process according to claim 1, wherein Q = S, and A = NR¹R².

6. A process according to claim 5, wherein Q = S, A = NR¹R² and R¹=R²=ethyl.

7. A process according to claim 5, wherein Q = S, A = NR¹R² and R¹ = R² = methyl.

* * * * *

UNITED STATES PATENT OFFICE
CERTIFICATE OF CORRECTION

Patent No. 3,694,460     Dated September 26, 1972

Inventor(s) David C. England, Maynard S. Raasch and William Arthur Sheppard

It is certified that error appears in the above-identified patent and that said Letters Patent are hereby corrected as shown below:

Col. 1, line 2, "A(C" should be -- -1,3- --;
line 57, "O3" should be -- $O_3$ --;

Col. 2, line 50, "+°C" should be -- +25°C --;

Col. 4, line 9, "-°C" should be -- -10°C --.

Signed and sealed this 20th day of November 1973.

(SEAL)
Attest:

EDWARD M. FLETCHER, JR.
Attesting Officer

RENE D. TEGTMEYER
Acting Commissioner of Patents